United States Patent [19]

Swanson et al.

[11] Patent Number: 5,062,150
[45] Date of Patent: Oct. 29, 1991

[54] FIBER-BASED FREE-SPACE OPTICAL SYSTEM

[75] Inventors: Eric A. Swanson, Maynard; Roy S. Bondurant, Carlisle, both of Mass.

[73] Assignee: Massachusetts Institute of Technology, Cambridge, Mass.

[21] Appl. No.: 417,828

[22] Filed: Oct. 6, 1989

Related U.S. Application Data

[63] Continuation-in-part of Ser. No. 299,088, Jan. 23, 1989.

[51] Int. Cl.$^5$ ............................................. H04B 10/00
[52] U.S. Cl. ................................ 359/152; 250/203.1; 359/159; 359/172; 359/180; 359/189
[58] Field of Search ............... 455/619, 607, 606, 617, 455/618; 350/484, 487; 250/203 R; 356/152

[56] References Cited

U.S. PATENT DOCUMENTS

| | | | |
|---|---|---|---|
| 3,449,587 | 6/1969 | Barnes | 350/96.1 |
| 3,941,927 | 3/1976 | Russell | 350/96.1 |
| 4,621,893 | 11/1986 | Lehmann | 350/6.5 |

FOREIGN PATENT DOCUMENTS

| | | | |
|---|---|---|---|
| 63-2006328 | 8/1988 | Japan . | |
| 2127643 | 4/1984 | United Kingdom | 455/617 |

OTHER PUBLICATIONS

Giannaris, R. J. and Mooradian, G. C., "Shipboard Electro-Optic System, Integration," Proceedings of SPIE, vol. 103, pp. 120–125, 1977.
Johnson, M., "High-Precision Multiposition Singlemode Fiber Switch Using Magnetic Levidation," SPIE, vol. 734, pp. 154–158, 1987.
Schrittenlacher et al., Proc. of EFOC/LAN 88 Exposition, pp. 52–54, "Ultra-Low Loss Mechanical Fiber Switch".
Johnson, Proc. of EFOC/LAN 88 Exposition, pp. 219–222, "Optical Powering Techniques for Microstructure Fiber Sensors".
Tenuta, Interim Report of Rome Air Development Center, Jun., 1981, "Fiber Optic Receiver Preamplifier Design".
Newport Corporation, Sales Brochure for FX-1000 Microtranslator, 18235 Mt. Baldy Cir., P.O. Box 8020, Fountain Valley, Calif. 92728.
McElroy et al., "$CO_2$ Laser Communication Systems for Near-Earth Space Applications", Proceedings of the IEEE, vol. 65, No. 2, Feb. 1977.
Bondurant et al., "An opto-Mechanical Subsystem for Space Based Coherent Optical Communication", SPIE, vol. 996, High Data Rate Atmospheric and Space Communications, 1988.
Kern et al., "Control of a Pointing, Acquisition, and Tracking Subsystem for Intersatellite Laser Links ISL$_2$", SPIC, vol. 810 Optical Systems for Space Applications, 1987.
Yasukawa et al., "Research and Development Activities of Optical ISLs in Japan", International Journal of Satellite Communications, vol. 6, pp. 141–152, 1988.

(List continued on next page.)

Primary Examiner—Curtis Kuntz
Assistant Examiner—Geoff Sutcliffe
Attorney, Agent, or Firm—Fish & Richardson

[57] ABSTRACT

An optical system has an optical package operable with an acquistion, tracking and pointing network, the optical package including a coupling device and an optical fiber and acting to carry optical signals and to transfer then into/out of the fiber, the fiber transferring the signals from/to a transmitter/receiver. An aspect of the invention includes a coupling device with a housing to which is affixed a flexure. A fiber extends along the flexure and terminates about one end of the flexure. An actuator is coupled between the flexure and the housing. The flexure is coupled to a detector to cooperate with the actuator for driving the flexure. The transmitter/receiver cooperates with the acquisition, tracking and pointing network to control the coupling device. Both coherent or non-coherent detection may be employed. Various features and embodiments are described.

24 Claims, 4 Drawing Sheets

OTHER PUBLICATIONS

Shikatani et al., "ETS-VI Experimental Optical Inter-Satellite Communication System", International Conference on Communications, Boston, Mass., Jun. 11–14, 1989.

Wittig et al., "Experimental and Preoperational Optical Intersatellite Links", SPIC, vol. 885, Free-Space Laser Communication Technologies, 1988.

Furch et al., "Optical Satellite Links for ESA's Space Missions", SPIC, vol. 810, Optical Systems for Space Applications, 1987.

Feldmann et al., "Airborne Laser Communications Scintillation Measurements and Model: A Comparison of Results", SPIC, vol. 885, Free-Space Laser Communication Technologies, 1988.

Johann et al., "A Free-Space Laser Communication Test-Bed Based on Coherent Diode-Pumped ND:YAG Laser Technology", presented at Free-Space Laser Communications Technologies-II, Los Angeles, Calif., Jan. 15–17, 1990.

Johann et al., "Diode Pumped Nd:Host Laser Transmitter for Intersatellite Optical Communications", presented at Free-Space Laser Communications Technologies-II, Los Angeles, Calif., Jan. 15–17, 1990.

Johann et al., "Design of a Diode-Pumped Nd:YAG Laser Communication System", presented at the 1991 SPIE Optical Fiber Communication Conference.

Carlson, "Technologies and Techniques for Lasercom Terminal Size, Weight, and Cost Reductions", presented at Free-Space Laser Communications Technologies-II, Los Angeles, Calif., Jan. 15–17, 1990.

Control Technics, Data Sheet for Piezo Series CTC-650, CTC-6151, CTC-6156, 22600-C Lambert Street, Suite 909, El Toro, Calif. 92630.

IntraAction Corp., Data Sheet for AOD-70 Acousto-Optic Deflector and ADM-70 Acousto-Optic Deflector-Modulator, 3719 Warren Avenue, Bellwood, Ill., 60104.

ConOptics Inc., Data Sheet for 310-Electro-Optic Beam Deflector, 67 Sandpit Road, Danbury, Conn., 06810.

FIBER-BASED FREE-SPACE OPTICAL SYSTEM

BACKGROUND OF THE INVENTION

The Government has rights in this invention pursuant to Grant Number AF19628-85-C-0002 awarded by the Air Force.

This application is a continuation-in-part of U.S. patent application Ser. No. 07/299,088 filed Jan. 23, 1989.

The present invention relates to fiber optics as applied to free-space coherent and incoherent optical systems.

The advantages of fiber optics in ground-based communication systems (whether telecommunications or radar, for example) is widely recognized. However, present space-borne optical systems (such as for communications and radar) typically rely on bulk optics, including mirrors and lenses rigidly mounted to an optical bench, to transfer light from optical sources to the exit aperture or from the entrance aperture to the optical receiver. Such designs are typically sensitive to thermal and mechanical perturbations, and may substantially impact upon the host payload and real estate utilization.

SUMMARY OF THE INVENTION

One aspect of the present invention includes a free-space optical system having an optical package having an interface with free-space and couplable to an acquisition, tracking and pointing network. The optical package includes an optical fiber connection device for interacting with a communication device; the two devices cooperate to transfer optical signals therebetween. The package is configured to transfer the signals under guidance of the network at the interface with free-space.

Various embodiments of this aspect may include any of the following features: The communication device may be a receiver and the optical package may include at least one nutation device. The connection device may include an optical fiber, and the optical package may act to transfer the optical signals into the fiber by nutation. The nutation device may include a beam steering mirror. The nutation device may include an active fiber coupler. The communication device may include a receiver and the optical package may further include a beam steering mirror, an active fiber coupler, and an acquisition, tracking and pointing network. At least the mirror or the coupler may be nutated. The nutation device may be a mechanical nutation device having a housing to which is affixed a flexure, the fiber guided by the flexure and terminating near an exposed end of the flexure, at least one actuator coupled between the flexure and the housing, or the nutation device may utilize an electro-optic or acousto-optic beam deflector in conjunction with a focusing lens to transfer signals into the fiber. The actuator may be electromagnetic, piezo-electric or electrostatic. The nutation device may be driven at a mechanical resonance. The nutation device may further include at least one positional sensor coupled between the housing and the flexure. The nutation device may further include at least two positional sensors, output signals of both sensors being applied to a position sensor amplifier section of the optical package, where the sensor output signals represent positional location of the fiber and which information is used to maximize coupling of the optical signals into the core of the fiber. The communication device may be a receiver. The invention may further include a local oscillator and an optical fiber, the local oscillator providing a signal which is combined with the optical signal to perform coherent detection, and the fiber for coupling the receiver to the optical fiber connection device preferably being single-mode, polarization-preserving. A GaAlAs diode laser may be used as a local oscillator laser having an output power of 30 mW and operable at a wavelength of 0.86 micrometers. The local oscillator and optical signals may be combined in a fiber coupler. The combining coupler may be a 3 dB coupler. The coupler may be coupled to a double balanced receiver. The position sensor output may be fed back to a dither generator to compensate for changes in the response of the nutation device. The system may include a beam steering mirror. The position sensor output may be applied to a demodulator to demodulate the receiver output signal, the demodulator output being applied via a loop compensation network to control position of the beam steering mirror.

The communication device may be a transmitter. The optical fiber connection device may include an optical fiber and the optical package may further include at least one active fiber coupler. The active fiber coupler facilitates the transfer of the optical signal from the optical fiber connection device to a target external to the system. The active fiber coupler may utilize nutation techniques. The active fiber coupler may be a mechanical device including a housing with a flexure affixed to the housing.

The fiber may be guided by the flexure, terminating near an exposed end of the flexure. At least one actuator may be coupled between the flexure and the housing. The actuator may be electromagnetic, piezo-electric, electrostatic, electooptic or acoustooptic. The active fiber coupler may further include at least one positional sensor coupled between the housing and the flexure or two positional sensors, output signals of both sensors being applied to a position sensor amplifier section of the optical package, such that the sensor output signals are used to control the angular direction of the optical signal the fiber. The positional sensor output may be used to direct the optical fiber to be used in bore-sighting the optical system. The positional sensor output may be used to direct the optical fiber to transmit a signal which is pointed ahead of a remote receiver location. The position sensor output may be fed back to a dither generator to compensate for changes in the response of the nutation device. The optical package may include an acquisition, tracking and pointing network.

In another aspect of the invention, where a focusing element focuses a received light beam at a desired focal point, a fiber-based receiver unit for free-space optical communication includes a tracking network and an active fiber coupler. A structure for translating an optical fiber is defined by the active fiber coupler such that the optical fiber has a terminus locatable approximately near the focal point. The active fiber coupler is disposed to radially control the translating structure to translate the optical fiber terminus about the focal point, the fiber intended to be coupled to a receiver, the active fiber coupler couplable via the receiver to the tracking network, the tracking network including actuation circuitry for assuring that the terminus of the optical fiber is maintained at or very near the focal point.

Various embodiments of this aspect may include any of the following features: The received light beam may be directed to the focal point via a beam steering mirror. The active fiber coupler may be a nutation device and may include at least one nutation position sensor. The tracking network may include a loop compensation network for actively controlling the position of the mirror responsive to nutation position signals supplied by the position sensor. The nutation device nutation may be actively compensated by a position control network responsive to the nutation position signals. The position control network may include a position sensor amplifier and a dither generator. The receiver unit may further include a local oscillator, the output of which is combined with the received light beam in a fiber optic coupler, the output of the latter being coupled to the receiver. The receiver may be double balanced. The fiber optic coupler may be a 3dB coupler. The fiber and coupler may be polarization preserving. The output of the receiver and of the position sensor may be coupled to a demodulator, the receiver so coupled via a bandpass filter and a detector for detecting the nutation signal imposed upon the received light beam.

In another aspect of the invention, an optical system for at least transmitting or receiving unguided optical signals includes an optical package, the optical package including at least a transmitter optical fiber connection device or a receiver optical fiber connection device, and at least a transmitter module or receiver module couplable to an acquisition, tracking, and pointing network. The transmitter module transfers signals to the optical package by means of the transmitter optical fiber connection device. The optical package is configured to transfer the signals over an unguided channel to a target external to the optical system. The receiver module receives optical signals from the optical package by means of the receiver optical fiber connection device. The optical package is configured to receive optical signals from the target via the unguided channel.

Various embodiments of this aspect may include any of the following features: The receiver optical fiber connection device may include an optical fiber, and coupling of the optical signals from the optical package into the receiver optical fiber may be facilitated by nutation. The nutation may be accomplished by radial electromagnetic, piezoelectric, or electrostatic mechanical displacement of a tip of the optical fiber, the tip being located in a focal plane of a focusing element. The nutation may also be accomplished by electro-optic, acousto-optic, or electro-mechanical angular deflection of a received optical beam as a focusing element focuses the light into the receiver optical fiber. The transmitter optical fiber connection device may include an optical fiber, and coupling of the optical signals from the transmitter optical fiber to the external target may be facilitated by nutation. Angular direction of the transmitted optical signals from the optical package may be controlled by radial electromagnetic, piezoelectric, or electrostatic mechanical displacement of a tip of the transmitter optical fiber, the tip being located in a focal plane of a collimating lens. Angular direction of the transmitted optical signals from the optical package may be controlled by electro-optic, acousto-optic, or electro-mechanical angular deflection of the transmitted optical signals after a collimating lens has collimated the light from the optical fiber.

In another aspect of the invention, a nutation device includes a housing to which a flexure is affixed. A fiber extends along the flexure and terminates about one end of the flexure. An actuator is coupled between the flexure and the housing. The flexure is coupled to a detector to cooperate with the actuator for driving the flexure at its mechanical resonance. The nutation device may include at least one position sensor and a dither generator, whereby changes in the device may be actively corrected so that the nutator will be nutated at a desired dither frequency and amplitude.

A fiber-based transmission unit includes a lens element for transferring a light beam at a desired focal point, with an active fiber coupler and an optical fiber connection device (such as an optical fiber) coupled to the active fiber coupler, the optical fiber connection device having a terminus approximately near the focal point, the active fiber coupler disposed to radially translate the optical fiber connection device terminus about the focal point, and the network including actuation circuitry for assuring that the connection device terminus is maintained at or very near the focal point.

Other advantages and features will become apparent from the following description of the preferred embodiment and from the claims.

DESCRIPTION OF THE PREFERRED EMBODIMENT

First we briefly describe the drawings.

FIG. 2b is a cross-sectional view of the coupler of FIG. 2a taken along line A—A in FIG. 2a.

In a free-space optical system, optical fibers can enable remotely locating the transmitter laser, local oscillator laser (in the case of coherent systems), and the receiver, spaced apart from the front-end optics. This yields flexibility in the mechanical, thermal, and electrical design which can enable reduction of size, weight and stability requirements of the optical module and can lead to easier integration and better utilization of the host platform. Key elements of a fiber optic optical module are the receiver and transmitter subsections. The receiver preferably not only will perform the communication or radar signature function, but will also serve as a spatial tracking sensor to the line-of-sight deviations induced by the host platform.

Figure 1:
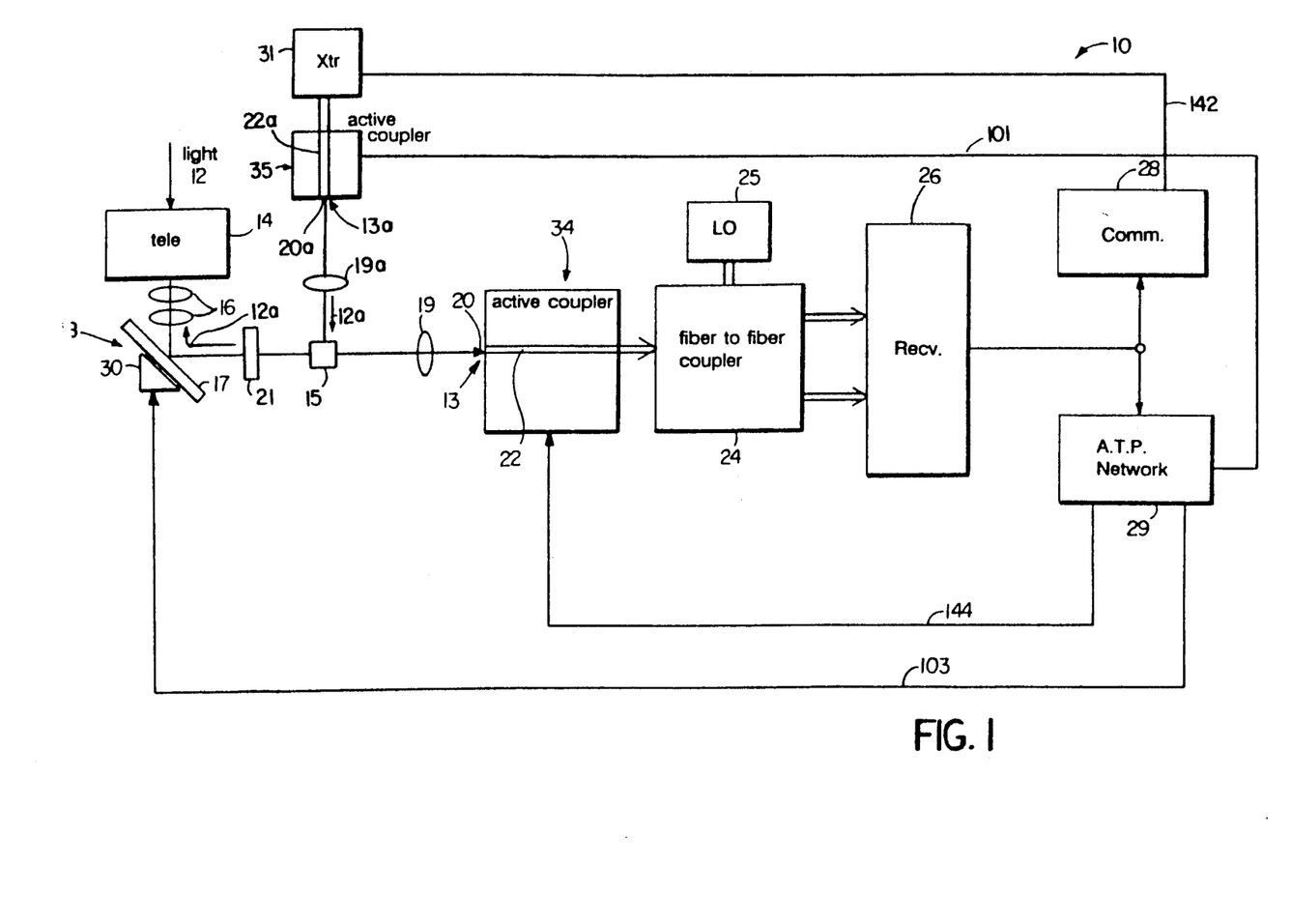
FIG. 1 is a block diagram of a fiber-based coherent optical system in practice of the present invention.

FIG. 1 shows a block diagram of a fiber-based coherent optical system 10 in practice of the present invention which can perform both the communication function and tracking function. (Note that for non-coherent systems the same block diagram applies with the exception of the local oscillator 25 laser and optical coupler 24.)

The information-carrying light beam (or field) 12 is collected and transmitted using a telescope and course pointing device, such as a gimballed optical telescope 14, so as to apply light beam 12, via mirror 17 of steering mirror assembly 18, to an optical fiber 22. More particularly, when receiving, telescope 14 images light beam 12 via relay optics 16 onto the surface of steering mirror 17, which in turn directs light beam 12 through $\lambda/4$ wave plate 21 and diplexer 15 and then via a focusing lens 19 to a focal point 13 (which point is desired to coincide with the exposed end of core 20 of optical fiber 22).

Alternatively, when transmitting, lens 19a collimates light beam 12a from focal point 13a (which point is desired to coincide with the exposed end of core 20a of optical fiber 22a) through diplexer 15 and λ/4 wave plate 21 onto the surface of steering mirror 17. Steering mirror 17 directs light beam 12a via relay optics 16 out telescope 14.

It is preferable that the free-space coupling end of optical fibers 22 and 22a be carried in active fiber couplers 34 and 35. Active fiber coupler 34 functions as a receiver signal coupler and active fiber coupler 35 functions as a transmitter signal coupler. It is possible that such devices could incorporate piezo electric or electrostatic technology. However, an electro-magnetic actuator is preferred.

For a coherent system, as shown in FIG. 1, when system 10 functions as a receiver, light beam 12 is combined with light from a local oscillator laser 25 by means of a fiber optic coupler 24, the combined signals are then passed via a receiver (such as a dual balanced receiver) 26 as an electronic signal to a communications package 28 (which conventionally processes the communication data supplied by signal light beam 12) and also to an acquisition, tracking and pointing network 29. Preferably, network 29 is electrically coupled to both the active fiber coupler 34 (via line 144), and to an actuator assembly 30 (via line 103) which drives beam steering mirror 17. In such embodiment, the acquisition, tracking and pointing network 29 acquires or angularly tracks the received signal beam 12 by driving mirror 17 and coupler 34 so as to position light beam 12 upon core 20 of optical fiber 22 at focal point 13 to maximize coupling of the light beam from free-space into the fiber.

When system 10 functions as a transmitter, remotely located transmitter 31 provides a signal light beam via optical fiber 22a to fiber optic coupler 35. Transmitter 31 is controlled by (or is responsive to) an electronic signal received (via line 142) from communications package 28. Acquisition, tracking and pointing network 29 is connected (via line 101) to active fiber coupler 35 to angularly point the transmitter beam signal (light beam 12a) by radially displacing the core end 13a of fiber 22a to maximize coupling of the light beam from the fiber to a target. Again, network 29 also may be engaged to control the position of mirror 17, as described above.

Figure 2A:
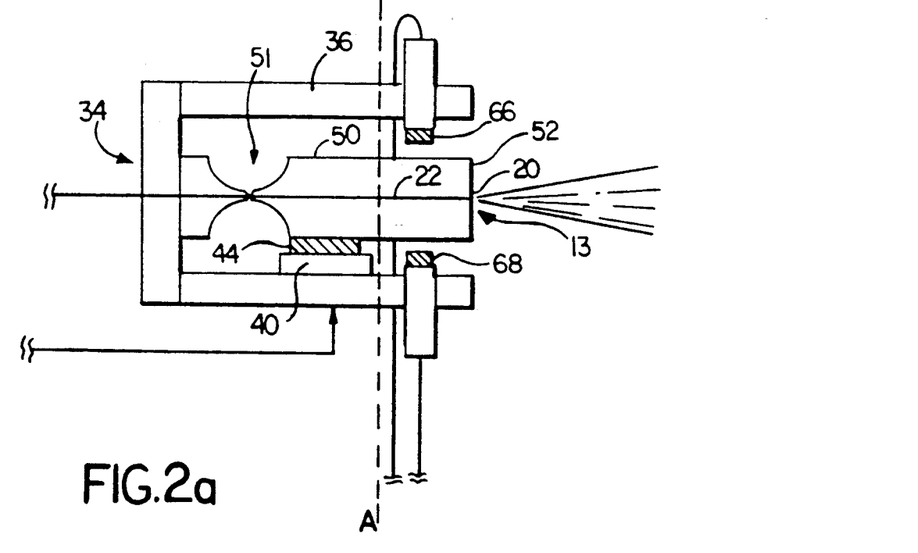
FIG. 2a is a side view of one embodiment of an active fiber coupler.
Figure 2B:
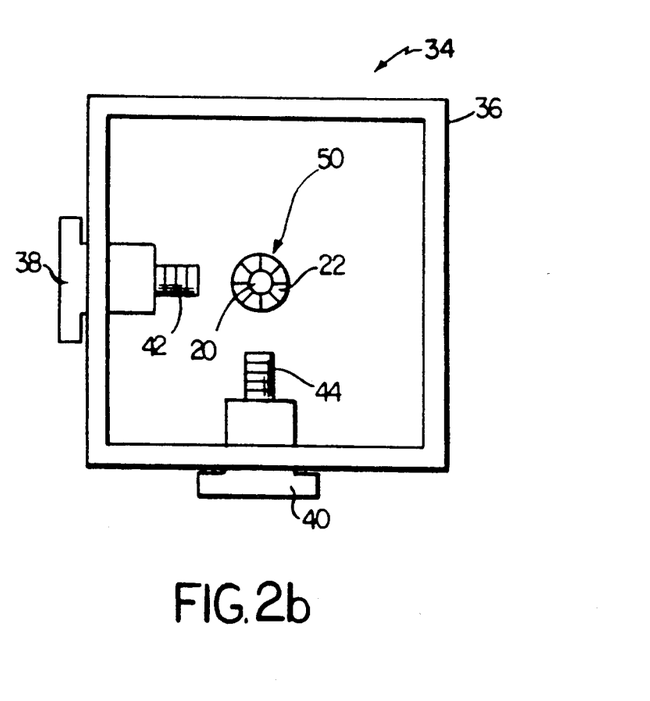

As seen in FIGS. 2a, 2b, a preferred active fiber coupler 34 includes a housing 36 to which are coupled magnetic poles 38, 40. These poles are provided with actuator coils 42, 44, respectively. Active fiber coupler 34 may thus function as a nutator. (It will be understood, however, that the present invention contemplates that nutation can be provided in many forms, such as via moving coils and fixed magnets or moving magnets and fixed coils, using piezoelectric, electrostatic or electrooptic devices, for example.) Optical fiber 22 is mounted within a flexure element 50 and preferably terminates at a first end 52 of flexure 50 (which is the location at which light beam 12 is applied from free-space to fiber core 20). (For coherent systems, the fiber and fiber optical coupler each are preferably single mode and polarization preserving. For non-coherent systems, no such coupler is required and the fiber need not be polarization preserving.)

Coupler 34 thus may form a part of a tracking error sensor by employing standard nutation techniques. A dither generator imposes a small circular scan on coupler 34 by actuation of flexure 50. (A larger dither amplitude increases tracking performance but decreases communication performance.) Tracking error signals are extracted by synchronously detecting the amplitude of the nutation signal. The resulting error signals are fed back to correct for tracking errors.

Flexure 50 is flexibly coupled to housing 36 by means of flexing joint 51 (although we have recently fabricated flexure 50 as a spring element without a joint 51, with good results). Whether with or without joint 51, flexure 50 is preferably configured to develop a desired mechanical response (amplitude and phase) at the desired nutation frequency. For example, the nutator will nutate at a frequency of approximately 10 times the desired beam steering mirror bandwidth. In order to use small, low power mechanical actuators, the mechanical resonance of the flexure can be designed to provide a mechanical amplification at the desired nutation frequency. This mechanical resonance feature is optional, although favorably incorporated into the preferred embodiment described herein.

FIG. 2a shows nutation device 34 having two opposed positional sensors 66, 68. These sensors are optional, although they are favorably incorporated in the preferred embodiment described herein.

Active fiber coupler 35 is structurally similar to active fiber coupler 34. However, while active fiber coupler 34 desirably has a small dynamic range and a high bandwidth, active fiber coupler 35 desirably has a large dynamic range and a low bandwidth to provide high positioning accuracy. The dynamic range and bandwidth of couplers 34, 35 may be controlled by adjusting the stiffness of flexure 50. For example, the stiffer that flexure 50 is made, the lower the low frequency amplitude and the higher the resonant frequency which is obtained. For the transmitter coupler, the flexure is made weak to provide high amplitude low frequency deflection, which are necessary to perform boresight and point-ahead functions. A bandwidth of ~100 Hz is probably more than sufficient to keep pace with the rate of change in the required point-ahead angle. The dynamic range is dictated by that needed for boresight plus that needed for point-ahead.

Figure 3:
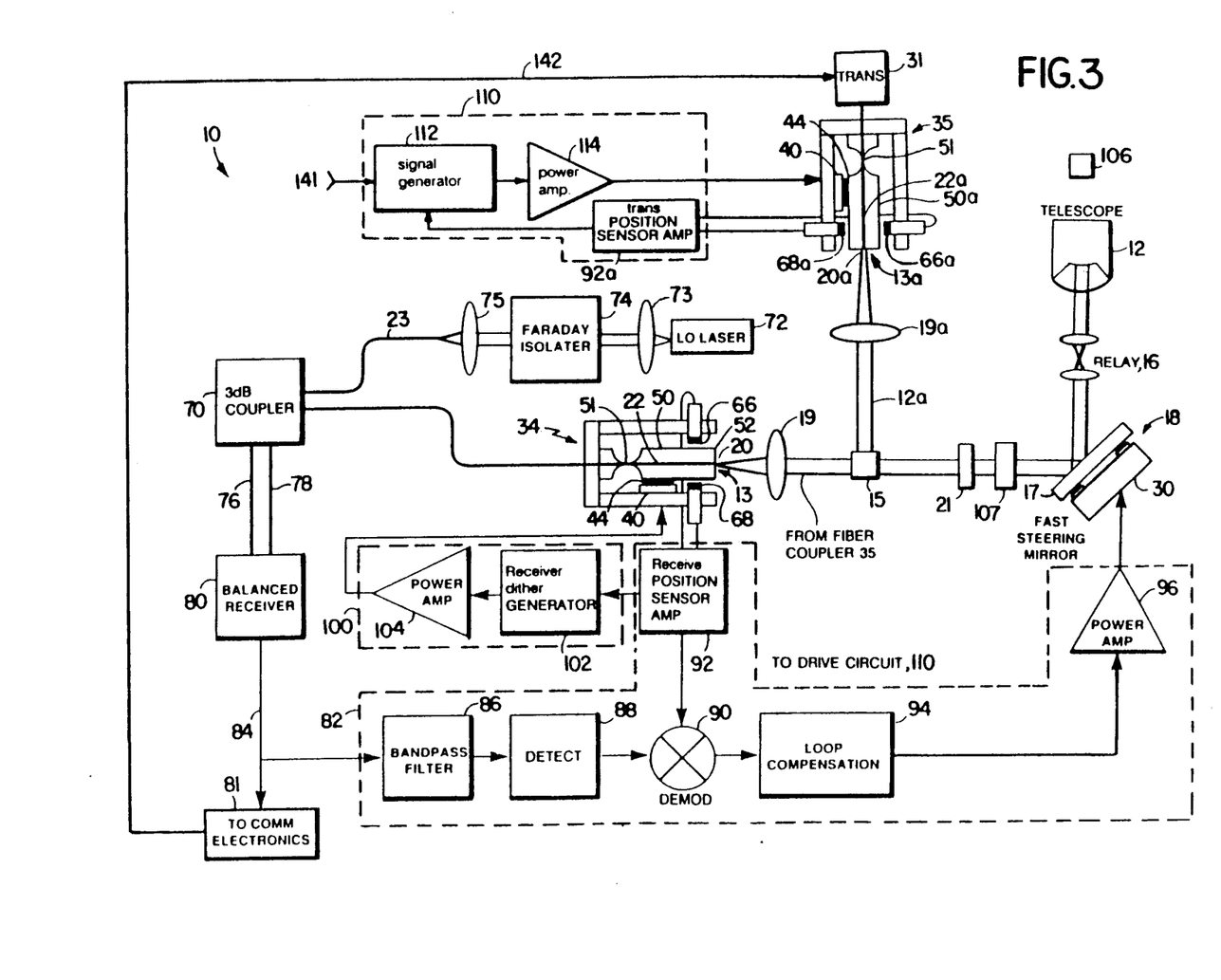
FIG. 3 is a block diagram of a preferred fiber-based coherent optical system in practice of the present invention.

Turning now to FIG. 3, a preferred embodiment of a fiber-based free-space optical system 10 includes telescope 14 and relay optics 16 as well as communication package 81 and acquisition and tracking controller 82. When system 10 is functioning as a receiver, relay optics 16 apply light beam 12 to mirror 17 of beam steering mirror 18, which in turn directs light 12 through λ/4 waveplate 21 and diplexer 15. When receiving, λ/4 waveplate 21 converts circular polarization to linear polarization, which is then directed via a polarization diplexer 15 toward the receiver portion of the system. Focusing lens 19 then focuses the light beam at focal point 13 near the end of core 20 of optical fiber 22. The optical fiber is presented to the light beam by means of fiber coupler 34 which may function as a nutation device.

When system 10 is functioning as a transmitter, the light beam which is provided near focal point 13a by core 20a of optical fiber 22a is collimated via lens 19a to provide a linearly polarized signal to diplexer 15. Diplexer 15 provides the linearly polarized signal (orthogonal to the received signal) to λ/4 waveplate 21 which in turn provides a circularly polarized light beam (in the opposite sense of the received light) to mirror 18, which in turn directs the light beam through relay optics 16 and out telescope 14. The light beam is presented to focal point 13a by means of fiber coupler 35.

In the preferred embodiment, for a coherent system, when receiving a signal, a single-mode, polarization-preserving fiber 22 preferably is used to carry light beam 12 to a single-mode polarization-preserving coupler 70. The other input to coupler 70 (preferably a 3 dB coupler) contains light from a local oscillator laser 72, which is provided via a single-mode, polarization-preserving fiber optic cable 23. For non-coherent systems, the coupler and local oscillator are not required and the fiber need not be polarization preserving. Optionally, a Faraday isolator 74 (and collimating and focusing lenses 73, 75) may be used to minimize feedback to the local oscillator laser, since isolation is critical to system performance. Laser 72 may be, for example, a GaAlAs diode laser, having an output power of 30 mW, operated at a wavelength of 0.86 micrometers.

The local oscillator field and the applied light field are combined in coupler 70. The combined signal is carried by means of fiber outputs 76, 78 to a receiver (preferably a double balanced receiver) 80. This receiver, in turn, is electrically coupled to a communications package 81 and acquisition and tracking controller 82.

The output signal 84 of receiver 80 is applied to demodulator 90 of controller 82 through a noise limiting bandpass filter 86 and detector 88. The electrical signal output from detector 88 contains information relating to the dither signal imposed (via nutation device 34) onto the received optical power in fiber 22 and is applied to demodulator 90. Also, position sensor amplifier 92 couples information from nutation position sensors 66, 68 to demodulator 90.

Nutation driver circuit 100 includes a dither generator 102 and a power amplifier 104, which, in a simplified embodiment of the present invention, can apply a constant amplitude signal (such as a sine wave) to the nutation driver circuit (magnets 38, 40 and respective coils 42, 44). A constant sinusoidal signal causes the nutator to oscillate in a circular manner at a desired frequency (such as 10 kHz), without any direct error compensation. In the preferred embodiment, the nutation driver circuit 100 is configured to compensate for any drift in the characteristics of coupler 34 to ensure that fiber core 20 oscillates in a circular manner at the desired frequency (which in the case of the resonant fiber nutator is at or near the mechanical resonance). Preferably, information from position sensor amplifier 92 is applied to dither generator 102. Dither generator 102 in turn responsively corrects for drift by varying its output in order to drive fiber core 20 in coupler 34 in a circular scan at the desired nutation frequency as best as possible centered at focal point 13, while at the same time the position sensor amplifier 92 output applied to demodulator 90 will apply tracking errors via loop compensator 94 and power amp 96 to actuator 30 of beam steering mirror assembly 18 to reposition mirror 17, so as to apply light beam 12 as best as possible dead-center to core 20 at focal point 13.

In one embodiment, demodulator 90 continually correlates the output from detector 88 with the position of fiber core 20. If the output of detector 88 is unchanged over one or more nutation cycles, then no repositioning signal need be applied to the steering mirror actuator 30 to reposition mirror 17. However, if the output of detector 88 is changing over one or more nutation cycles, then the demodulated tracking error signal is applied to drive actuator 30 by means of loop compensation and power amplifier circuits 94, 96. That is, demodulator 90 can favorably correlate the position of fiber core 20 with received power to extract tracking information, so as to provide error compensation to steering mirror assembly 18 to better position focal point 13 at the exposed end of core 20. (While FIG. 3 is one dimensional, it will be appreciated that the tracking and correlation process is responsive in both azimuth and elevation.)

When the system is functioning as a transmitter, communication electronics 81 instructs (via line 102) transmitter 31 to provide a signal via polarization-preserving single-mode optical fiber 22a to active fiber coupler 35. The location of core 20a is controlled by controller 110 in response to a pointing command input 141 derived from boresight, target, and/or ephemaris information, generated in any conventional manner. More specifically, sensors 66a and 68a of fiber coupler 35 provide information to transmitter position sensor 92a. Transmitter signal generator 112 uses this information in conjunction with the command input 141 to determine whether core 20a is correctly positioned and, if not, provides a control signal to power amp 114 to correct the core position.

System 10 can, without the use of any external signals, automatically perform a boresight function. The boresight function is required in order to compensate for misalignments due to launch loads and on-orbit thermal and mechanical disturbances. Boresight may be accomplished, for example, by flipping a retro-reflector 107 into the transmitted beam after λ/4 waveplate 21 or by directing mirror 17 to a retro-reflector 106 located external to the optical system. The reflected transmitter light from the retroreflector (now polarized in the opposite sense) is directed onto receiver fiber coupler 34. Using standard detection techniques, the transmitter fiber coupler 35 can be displaced until the power into receiver coupler 34 is maximized, thus accomplishing boresight. The transmitter and receiver fiber couplers 34, 35 may be mounted in close proximity to one another to minimize the range required for boresight. In a preferred embodiment, due to the close proximity of transmitter and receiver fiber couplers 35, 34 and the short optical path between the couplers, a dynamic range of approximately ±5 beamwidths (or core diameters) is sufficient to accomplish the boresight function.

The required point-ahead angle is approximately equal to the differential tangential velocity between system 10 and the location to which system 10 is transmitting divided by the speed of light. A point-ahead angle of ~52μrad is sufficient for most applications. For example, an antenna having a beamwidth of 4μrad results in a dynamic range requirement of ±13 beamwidths. Therefore the total required dynamic range is ±18 beamwidths. For example, at 0.86μm wavelength, ±1 beamwidths corresponds to approximately ±82μm of fiber core translation.

In order to ensure that the point-ahead angle is accurately implemented, high precision position sensors 66a, 68a are preferred on transmitter fiber coupler 35. High DC stability insures that the boresight position is accurately maintained. High precision and repeatability also insures that the proper point-ahead displacement from boresight is achieved.

While actuation of the steering mirror assembly can be eliminated by feeding back position signals directly to the active fiber coupler 34 only, there are two reasons for including such actuation. First, its use can increase dynamic range. Second, the point-ahead requirement for free-space communication systems is more easily implemented by combining the transmit and receive beams (with the appropriate angular offset) after the steering mirror has tracked out platform disturbances. In order to support the tracking loop bandwidths necessary for free-space optical communication systems (such as open-loop cross-over frequencies of 100 Hz to 1 kHz) dithering at high frequency (such as at approximately 1 kHz to 10 kHz) is preferred.

Figure 4:
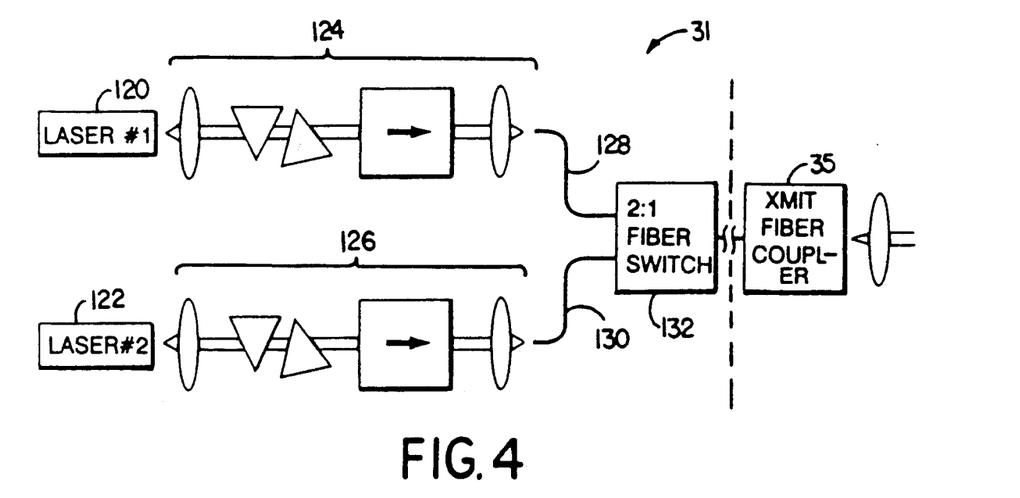
FIG. 4 is a block diagram of a preferred transmitter in practice of the present invention.

Referring to FIG. 4, transmitter 31 is shown in detail with a pair of lasers 120, 122. However, any number of lasers (including a single laser) may be used. Lasers 120, 122 provide laser beams that are collimated and circularized using anamorphic prism pairs, sent through an optical isolator and focused via focusing lens systems 124, 126, respectively, to maximize the coupling into the polarization preserving optical fibers 128, 130. The optical fibers are then provided to fiber interface device 132 (e.g., since there are two lasers, a 2:1 fiber switch or other active and passive fiber components) which manipulates the incoming optical signals (e.g., multiplexes the signals or combines the signals). The manipulated signal is then provided to fiber coupler 35. Alternately, redundancy may be provided by nesting the cores of two (or more) fibers close together within fiber coupler 35.

Transmitter 31 requires high coupling efficiency, low feedback, and redundancy. An unfortunate consequence of maintaining high coupling efficiency is the associated high sensitivity to feedback. In order to minimize the effects of feedback into transmitter lasers 120, 122, over 60 dB of isolation is desired. In a preferred embodiment, Fresnel reflections from the input and exit fiber facets can effectively be minimized by polishing the fiber facets on an angle and anti-reflection coating.

Figure 5:
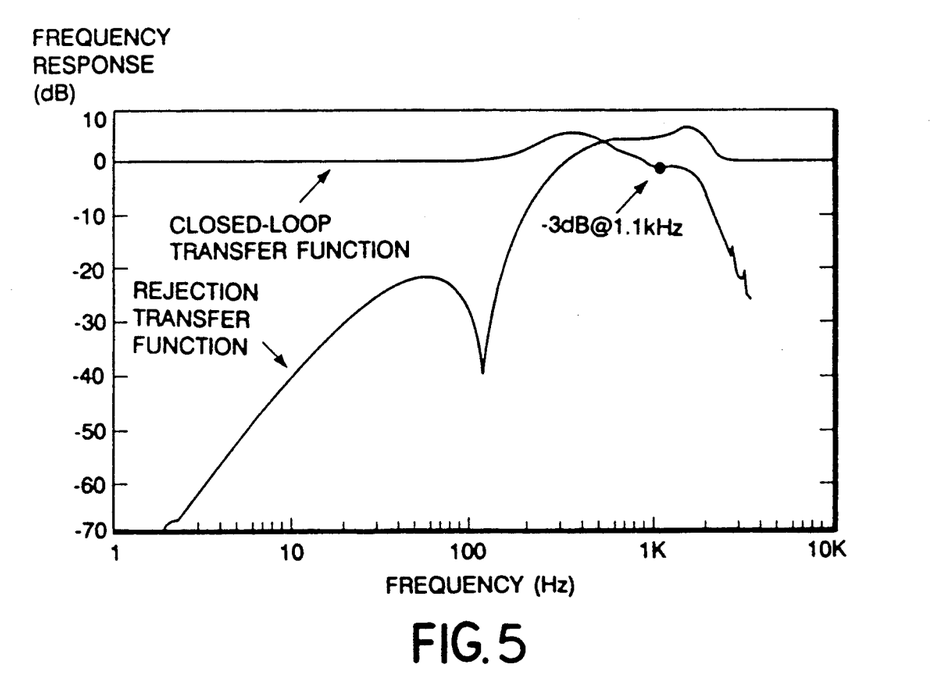
FIG. 5 is a graphical representation of closed-loop and rejection transfer functions in practice of one embodiment of the present invention.

FIG. 5 shows the measured closed-loop and rejection transfer functions that were obtained in one embodiment by feeding back the error signal output of demodulator 90 to a typical, two-dimensional fast steering mirror assembly 18. (These measurements apply for both azimuth and elevation axes.) This design included a 9 kHz dither frequency, 500 Hz open-loop cross-over frequency, and 43° of open-loop phase margin. The resulting −3 dB closed-loop bandwidth is approximately 1.1 kHz.

It will now therefore be understood that the present invention makes it possible to accurately position the focal point 13 (or 13a) of the received field 12 (or 12a) at the exposed end of the fiber core 20 (or 20a) of fiber 22, (or 22a) so as to optimally transfer light beam 12 (or 12a) from free-space into the fiber (or vice versa). This is achieved by means of, in one embodiment, steering the light beam by actuation of the beam steering mirror assembly 18 and generating an error signal (such as by dithering the beam steering mirror or by means of separate optical detectors, e.g., quadrant detectors). In another embodiment, improved coupling may be achieved by use of an active fiber coupler (such as a dithered nutation device) 34 (or 35), which can be responsively driven to assure accurate coupling of beam 12 (or 12a) into fiber 22 (or 22a) at focal point 13 (or 13a). In a preferred embodiment, nutation device 34 (or 35) and steering mirror assembly 18 are both responsively controlled to assure accurate coupling of beam 12 (or 12a) into fiber 22 (or 22a) at focal point 13 (or 13a), using a dithering technique for generation of error signals.

Other embodiments are within the following claims.

What is claimed is:

1. A satellite-based communications and tracking system which allows mechanical decoupling and spatial separation of processing modules, comprising:
   a receiver fiber coupler,
   a telescope module for tracking and collecting light from a light source and focusing said light onto said receiver fiber coupler,
   a satellite-based receiving module for processing collected light,
   feedback circuitry responsive to said receiving module for generating control signals to direct said telescope to track said light source, and
   a receiver optical fiber for carrying light from said receiver fiber coupler to said receiving module;
   whereby the position of said receiving module may be varied with respect to said telescope module because of the use of said optical fiber.

2. The system of claim 1 wherein
   said telescope module comprises a beam steering mirror which is mechanically actuable to steer light in response to control signals form said feedback circuitry.

3. The system of claim 2 wherein:
   said fiber coupler comprises
   a housing,
   a flexure affixed to said housing, the fiber being guided by said flexure and terminating near an exposed end of the flexure,
   a flexure actuator coupled between said flexure and said housing,
   two positional sensors coupled between said housing and said flexure which generate position signals representative of the positional location of said flexure,
   nutation circuitry for combining said position signals with a nutation signal, and
   an amplifier for driving said flexure actuator in response to the output of said nutation circuitry.

4. The system of claim 3 wherein said feedback circuitry comprises a demodulator combining the signals generated by said receiving module with the position signals from said position sensors to generate control signals representative of the two-dimensional error in the position of said beam steering mirror.

5. A satellite-based communications and tracking system which allows mechanical decoupling and spatial separation of processing modules, comprising
   a telescope module for tracking a desired target and radiating light toward said target,
   a light satellite-based transmitting module for generating optical signals and coupling said optical signals into a first end of a transmitter optical fiber,
   a transmitter fiber coupler supporting a second end of said transmitter fiber to couple said optical signals from said fiber to said telescope module,
   whereby the position of said telescope module may be varied with respect to said transmitting module because of the use of said optical fiber.

6. The system of claim 5 further comprising
   a receiver fiber coupler,
   a diplexer for relaying light received from said transmitting module via sad transmitter fiber to sad telescope module, and for relaying light received from said telescope module to said receiver fiber coupler, a receiving module for processing collected light, feedback circuitry responsive to said receiving module for generating control signals to direct said telescope module to track the desired target, and a receiver optical fiber for carrying light from said receiver fiber coupler to said receiving module, whereby said receiving module may also be mechanically decoupled and spatially separated form said telescope module.

7. The system of claim 6 wherein:

each said fiber coupler comprises
- a housing,
- a flexure affixed to said housing, the fiber being guided by said flexure and terminating near an exposed end of the flexure,
- a flexure actuator coupled between said flexure and said housing,
- two positional sensors coupled between said housing and said flexure which generate position signals representative of the positional location of said flexure,
- nutation circuitry for combining said position signals with a nutation signal, and
- an amplifier for driving said flexure actuator in response to the output of said nutation circuitry.

8. The system of claim 7 wherein said transmitter fiber coupler further comprises
- point ahead circuitry responsive to the positional sensors on said transmit fiber coupler for directing said the transmit fiber coupler actuators to point the light from aid transmitting module a predetermined angle ahead of the desired target.

9. The system of claim 7 further comprising
- bore sighting optics for reflecting light from said transmitting module back to said receiving module, and
- bore sighting circuitry responsive to the fiber coupler positional sensors and the output of said receiving module for enabling said bore sighting optics to reflect light from said transmitting module back to said receiving module, and thereafter adjust the position of said transmitter and receiver couplers to bore-sight said system.

10. The system of claim 1 or 6 wherein said receiving module is adapted to perform coherent detection, and comprises
- a local oscillator, and
- a coupler for combining light from said local oscillator with light carried by said receiver optical fiber.

11. The system of claim 10 wherein said receiving module comprises a double-balanced receiver.

12. The system of claim 1 or 5 wherein the end of said fiber is mechanically movable by said fiber coupler.

13. The system of claim 1 or 5 wherein:
said fiber coupler comprises a housing, a flexure affixed to said housing, and at least one flexure actuator coupled between said flexure and said housing, and
said fiber is guided by said flexure and terminates near an exposed end of the flexure.

14. The system of claim 13 wherein said flexure is nutated to enhance coupling of the focused light into said fiber.

15. The system of claim 14 wherein said flexure is nutated at its mechanical resonant frequency.

16. The system of claim 14 wherein said fiber coupler further comprises a positional sensor coupled between said housing and said flexure.

17. The system of claim 1 or 5 wherein:

said fiber coupler comprises
- a housing,
- a flexure affixed to said housing, said fiber being guided by said flexure and terminating near an exposed end of the flexure,
- a flexure actuator coupled between said flexure and said housing,
- a positional sensor coupled between said housing and said flexure which generates position signals representative of the positional location of the flexure.

18. The system of claim 17 wherein:
said fiber coupler further comprises
- nutation circuitry for combining said position signals with a nutation signal, and
- an amplifier for driving said flexure actuator in response to the output of said nutation circuitry.

19. The system of claim 17 wherein
said flexure actuator comprises and elector-magnetic actuator.

20. The system of claim 17 wherein
said flexure actuator comprises a piezo-electric actuator.

21. The system of claim 17 wherein
said flexure actuator comprises an electro-static actuator.

22. The system of claim 1 or 5 further comprising
an electro-optic beam deflector for transferring deflected light into said fiber.

23. The system of claim 1 or 5 further comprising
an acousto-optic beam deflector for transferring deflected light into said fiber.

24. The system of claim 1 or 5 wherein
said fiber is single-mode and polarization-preserving.

* * * * *

UNITED STATES PATENT AND TRADEMARK OFFICE
CERTIFICATE OF CORRECTION

PATENT NO. : 5,062,150

DATED : October 29, 1991

INVENTOR(S) : Eric A. Swanson et al.

It is certified that error appears in the above-identified patent and that said Letters Patent is hereby corrected as shown below:

Col. 10, line 67, "sad" should be --said-- (2 occurrences).

Col. 11, line 10, "form" should be --from--.

Col. 11, line 33, "aid" should be --said--.

Signed and Sealed this

Thirteenth Day of July, 1993

Attest:

MICHAEL K. KIRK

Attesting Officer

Acting Commissioner of Patents and Trademarks